Sept. 17, 1940.　　　　P. UPHAM　　　　2,215,258
SNAP FASTENER MEMBER
Original Filed Dec. 27, 1937
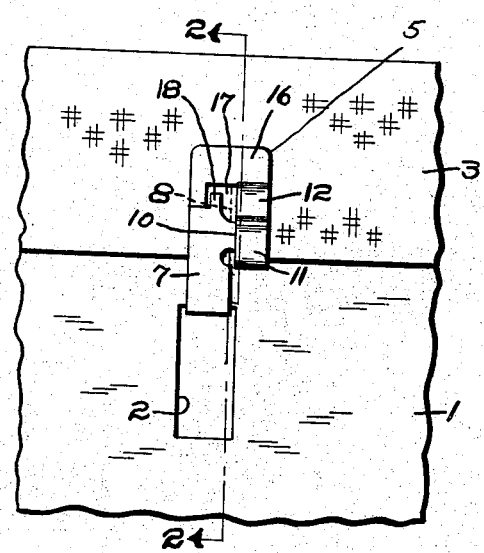
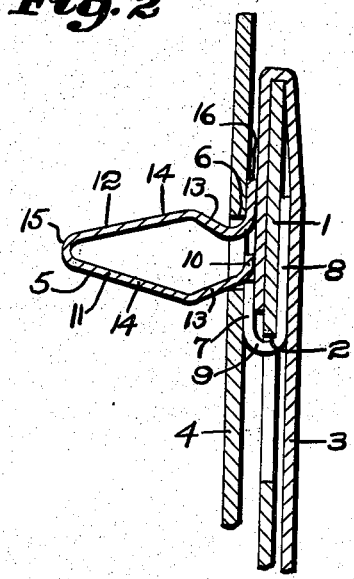
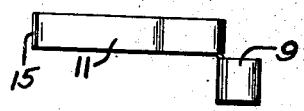
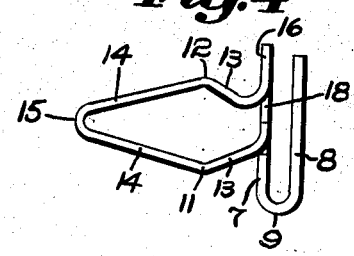
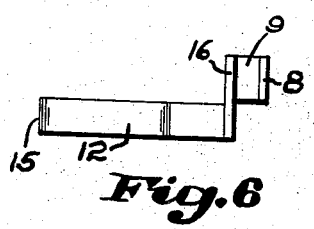
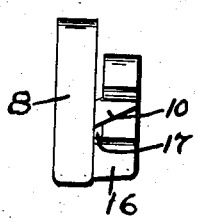
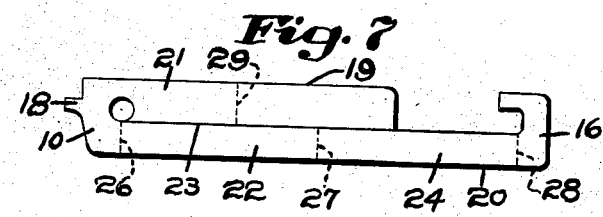
Inventor:
Preston Upham.
by Walter S. Jones
Att'y Patented Sept. 17, 1940

2,215,258

UNITED STATES PATENT OFFICE 2,215,258

SNAP FASTENER MEMBER

Preston Upham, Newton, Mass., assignor to United-Carr Fastener Corporation, Cambridge, Mass., a corporation of Massachusetts Original application December 27, 1937, Serial No. 181,755. Divided and this application August 17, 1938, Serial No. 225,323

3 Claims. (Cl. 24—73)

My invention relates to improvements in snap fastener members of the so-called hook-on type.

Reference is hereby made to my application Serial No. 181,755, filed December 27, 1937, of which this application is a division and which has claims relating particularly to the method of making the fastener of the present application.

In the drawing, which illustrates a preferred embodiment of my invention—

Figure 1 is a rear view of a portion of an upholstery panel, ready for attachment to a support, showing my improved fastener member;

Fig. 2 is a section taken on the line 2—2 of Fig. 1, a portion of the support also being shown;

Fig. 3 is an end view of my fastener member per se;

Fig. 4 is a side view of the fastener member shown in Fig. 3;

Fig. 5 is a view of the opposite end of my fastener member from that shown in Fig. 3;

Fig. 6 is a bottom plan view of my fastener member per se; and

Fig. 7 is a plan view of the blank from which my fastener member is formed.

Referring to the drawing, in which I have shown a preferred installation, I have set out in Figs. 1 and 2 a trimming installation for automobiles and the like. In the installation shown in the drawing the panel device to which my fastener member is attached comprises a backing 1 which may be of cardboard or the like material having a rectangular-shaped aperture 2 therein adapted to receive a portion of the fastener member for securing the fastener to the panel. The front face of the backing is covered with a cloth covering 3 which is folded over the edge and secured to the backing in the manner well known in the art. In order to secure the backing to a supporting structure 4, I have provided a fastener member 5 having a hook-shaped base portion adapted to engage the panel device and a snap fastener means adapted to extend through an aperture 6 of the support 4 and enter into cooperating fastener engagement with material of the support 4 surrounding the aperture 6.

Referring in detail to my preferred form of fastener member, I have provided a fastener which is formed from one piece of spring metal. My preferred fastener has a clip-like or U-shaped base adapted to engage the panel device and a snap fastener stud means extending from one side of the base. The base of the fastener includes a pair of spaced-apart arms 7 and 8 which are preferably disposed in substantially parallel relation. The arms 7 and 8 are connected together at an end 9 (Fig. 4) of the base. The upper arm 7 has a portion 10 extending laterally beyond an edge thereof near its free end, as most clearly shown in Figs. 1 and 6. A snap fastener stud means is integrally joined to the portion 10 and extends in angular relation to the lateral plane of the arm 7. The stud means comprises a pair of yieldable legs 11 and 12, each of which, in my preferred form, has a diverging portion 13 and a converging portion 14 for providing a shoulder for engagement with material of the support 4 surrounding the aperture 6. The legs 11 and 12 are connected at their leading ends to form a nose 15 for guiding the stud means into the aperture of the support. The opposite end of the leg 11 from that connected to the leg 12 is integrally joined to the laterally-extending portion 10 and the leg 11, together with a portion of the leg 12 adjacent the nose 15, is preferably formed entirely from material which is cut adjacent an edge of the arms 7 and 8 and doubled over upon itself, as most clearly shown in Fig. 2. At the free end of the leg 12 I have provided a foot portion 16 which lies substantially within the lateral plane of the arm 7 and serves to give additional length to the arm 7 whereby the fastener member may engage more securely the panel device. It will be noticed that in my preferred form I have provided an opening 17 (Fig. 1) between the foot portion 16 and the free end of the arm 7 so as to permit proper contraction of the leg 12 relative to the leg 11 during insertion of the legs through the aperture 6 of the support. As a means for regulating the action of the leg 12 relative to the leg 11, I have provided, in my preferred form, a lug 18 extending beyond the free end of the arm 7 (Fig. 1) and adapted to abut an edge of the foot portion 16 for limiting movement of the leg 12 relative to the leg 11. The action of this construction is about as described and illustrated in United States Letters Patent to Walter I. Jones, No. 2,084,559, issued June 22, 1937.

My preferred method of making the fastener member to which my present invention is directed will be clearly understood by those skilled in the art from inspection of Fig. 7 in which I have illustrated the blank from which my snap fastener member is formed. It will be noticed that the blank comprises a body portion 19 and a substantially L-shaped portion 20 extending beyond one end of the body portion. The body portion 19 comprises a portion 21 and a portion 22. The portion 22 is joined to one end of the body portion and formed by shearing along the line 23 of the material of the body portion adjacent a lateral edge thereof. The L-shaped portion 20 has a thin leg portion 24 which forms a continuation of the portion 22 of the body portion and a laterally-extending portion 25 at the free end of the portion 24. The thin leg portion 24 forms a portion of the leg 12 of my completed fastener member and the laterally-extending portion 25 forms the foot portion 16 of the fastener member. In forming the completed fastener member from the blank, the snap fastener means is preferably formed first through bending the portion 22 substantially along the dotted line 26 so that the portions 22 and 20 extend in angular relation to the body portion 19 of the fastener and then bending the portion 22 substantially along the dotted line 27 to fold the portion 20 over so as to form the legs 11 and 12 of the snap fastener means. The legs 11 and 12 may next be pinched to provide the shouldered formations, and finally the portion 20 is bent substantially along the dotted line 28 so as to form the foot portion 16 which is preferably disposed in the plane of the upper arm 7 of the completed fastener (Figs. 2 and 4). Thus the leg 11 is formed from that portion of the piece 22, between its point of junction with the body 19 and the line of bending 27, and the leg 12 is formed from the portion of the piece 22 on the other side of the line of bending 27 and the thin leg portion 24 of the L-shaped portion 20. Finally, the portion 21 of the body portion 19 is doubled over substantially along the dotted line 29 so as to form the spaced connected arms 7 and 8. Thus it will be seen that by my improved method I have made a fastener member from a relatively small blank in a novel, simple and inexpensive manner.

My improved fastener stud member is preferably applied to an upholstery panel installation after the covering 3 is secured to the backing and from the rear side by inserting the arm 8 through the aperture 2 and moving the fastener member into the position shown in Figs. 1 and 2 with the end 9 of the base substantially abutting a wall of the panel 1 adjacent the aperture 2. The panel may now be secured to the support 4 through snapping the snap fastener means 5 of the fastener member through the aperture 6 of the support.

Thus by my invention I have provided a fastener member which is simple and inexpensively constructed and capable of satisfactory operation in connection with an installation of the type illustrated and described and also other installations.

Although I have illustrated and described a preferred embodiment of my invention, I do not wish to be limited thereby because the scope of my invention is best defined in the following claims.

I claim:

1. A snap fastener of the class described comprising a hook-like base portion adapted to engage a part to be held in place by said fastener, a portion extending laterally beyond a side edge of one portion of said base portion and a snap fastener stud means in the form of a pair of shouldered legs integral with said laterally-extending portion.

2. A snap fastener of the class described comprising a base, a projection at one side of said base and a snap fastener stud means integral with said projection, said snap fastener means having shouldered leg portions connected at their leading ends, one of said leg portions being integrally joined to said projection at one edge and the other of said leg portions having a free end disposed substantially in the plane of said projection adjacent to the opposite edge of said projection.

3. A snap fastener of the class described comprising a base having spaced-apart arms connected at one end, an integral portion extending laterally beyond an edge of one of said arms and a snap fastener means integral with said laterally-extending portion, said snap fastener means having diverging and converging leg portions formed entirely from material taken from adjacent lateral edges of the material forming the arms of said base portion, said leg portions being connected at their leading ends, the free end of one of said legs being integrally joined to said laterally-extending portion, and the other of said legs having a foot portion at its free end lying in the plane of an arm of said base portion and said laterally-extending portion and contacting with one of them for the purpose described.

PRESTON UPHAM.